US012545069B2

(12) United States Patent
Szymanski et al.

(10) Patent No.: US 12,545,069 B2
(45) Date of Patent: Feb. 10, 2026

(54) HYDRAULIC LIFT FOR STAND-ALONE COIL SPRING

(71) Applicant: BeijingWest Industries Co., Ltd., Beijing (CN)

(72) Inventors: Jerzy Piotr Szymanski, Villeneuve les Sablons (FR); Thierry Michel Lagarde, Barcy (FR)

(73) Assignee: BeijingWest Industries Co., Ltd., Beijing (CN)

( * ) Notice: Subject to any disclaimer, the term of this patent is extended or adjusted under 35 U.S.C. 154(b) by 136 days.

(21) Appl. No.: 18/515,202

(22) Filed: Nov. 20, 2023

(65) Prior Publication Data

US 2024/0166008 A1 May 23, 2024

Related U.S. Application Data

(60) Provisional application No. 63/427,093, filed on Nov. 21, 2022.

(30) Foreign Application Priority Data

Nov. 7, 2023 (CN) .......................... 202311474751.2

(51) Int. Cl.
*B60G 17/015* (2006.01)
*B60G 17/056* (2006.01)

(52) U.S. Cl.
CPC ....... *B60G 17/0152* (2013.01); *B60G 17/056* (2013.01); *B60G 2202/12* (2013.01); *B60G 2202/413* (2013.01); *B60G 2500/30* (2013.01)

(58) Field of Classification Search
CPC ............ B60G 2500/30; B60G 2202/12; B60G 2202/413; B60G 17/0272; B60G 2204/124; B60G 2204/1242

(Continued)

(56) References Cited

U.S. PATENT DOCUMENTS 3,584,541 A * 6/1971 Cunningham ...... F15B 15/1447
91/468
4,361,346 A * 11/1982 Harris ..................... B60T 8/172
280/DIG. 1

(Continued)

FOREIGN PATENT DOCUMENTS

DE          19632806 A1 *  2/1998  ......... B60G 17/0272
DE     102006005102 B3 *  9/2007  ............. B60G 11/15

(Continued)

OTHER PUBLICATIONS

Extended European Search Report issued on Apr. 19, 2024 for counterpart European patent application No. 23210864.7.

*Primary Examiner* — Logan M Kraft
*Assistant Examiner* — Joshua Campbell
(74) *Attorney, Agent, or Firm* — William H. Honaker; Dickinson Wright PLLC

(57) ABSTRACT

A hydraulic lift actuator for adjusting the height of a vehicle includes: a top mount plate configured for attachment to a chassis element; a hydraulic cylinder having a tubular wall and an end cap, together defining an interior chamber; a piston rod extending axially into the interior chamber; a piston assembly connected to the piston rod and disposed within the interior chamber, wherein the piston assembly divides the interior chamber into an upper chamber and a lower chamber, the lower chamber extending between the piston assembly and the end cap; and a spring seat rigidly connected to the hydraulic cylinder and configured to engage an upper end of a coil spring, wherein the spring seat and the hydraulic cylinder are linearly translatable relative to the piston rod between a retracted position adjacent to the top mount plate and an extended position spaced apart from the top mount plate.

17 Claims, 4 Drawing Sheets

(58) Field of Classification Search
USPC .......................................... 280/5.514; 701/37
See application file for complete search history.

(56) References Cited

U.S. PATENT DOCUMENTS

| | | |
|---|---|---|
| 5,401,053 A | 3/1995 | Sahm et al. |
| 6,902,045 B2 | 6/2005 | Oliver et al. |
| 9,139,064 B2 | 9/2015 | Marble et al. |
| 11,718,137 B2 | 8/2023 | D'Orazio et al. |
| 2012/0074660 A1 | 3/2012 | Thomas |
| 2013/0221626 A1* | 8/2013 | Lee ....................... B60G 17/08 |
| | | 280/5.514 |
| 2016/0114645 A1* | 4/2016 | Kim .................... B60G 17/033 |
| | | 280/5.514 |
| 2023/0256787 A1 | 8/2023 | Jefferies et al. |

FOREIGN PATENT DOCUMENTS

| | | | |
|---|---|---|---|
| DE | 102011079714 A1 * | 1/2013 | ......... B60G 17/0272 |
| FR | 2769544 A1 * | 4/1999 | ......... B60G 17/0272 |
| JP | 58030811 A * | 2/1983 | ........... B60G 15/063 |
| JP | 60259512 A * | 12/1985 | ........... B60G 17/015 |

* cited by examiner

HYDRAULIC LIFT FOR STAND-ALONE COIL SPRING

CROSS REFERENCE TO RELATED APPLICATIONS

This U.S. utility patent application claims the benefit of U.S. Provisional Patent Application No. 63/427,093, filed Nov. 21, 2022, and China Non-Provisional Patent Application No. CN202311474751.2, filed Nov. 7, 2023, the contents of each are incorporated herein by reference in their entirety.

BACKGROUND OF THE INVENTION

1. Field of the Invention

The present disclosure relates generally to systems for adjusting the height of a vehicle. More specifically, the present disclosure pertains to an electro-mechanical system for adjusting the height of a vehicle having stand-alone coil springs, and an actuator for such a system.

2. Related Art

Systems capable of changing vehicle height can enable additional functionalities and play important role to improve vehicles energy efficiency. However, the development of electro-mechanical solutions for adjusting vehicle ride height have encountered a number of technical and cost challenges.

U.S. Pat. No. 6,902,045 describes one such example of a system for adjusting vehicle height. The system and apparatus of U.S. Pat. No. 6,902,045 may be used to adjust the height of a front end of a vehicle having a coil-over shock suspension.

SUMMARY OF THE INVENTION

The present disclosure provides a hydraulic lift actuator for adjusting the height of a vehicle. The hydraulic lift actuator includes: a top mount plate configured for attachment to a chassis element of the vehicle; a hydraulic cylinder having a tubular wall and an end cap, together defining an interior chamber; a piston rod extending axially into the interior chamber; a piston assembly connected to the piston rod and disposed within the interior chamber, wherein the piston assembly divides the interior chamber into an upper chamber and a lower chamber, the lower chamber extending between the piston assembly and the end cap; and a spring seat rigidly connected to the hydraulic cylinder and configured to engage an upper end of a coil spring, wherein the spring seat and the hydraulic cylinder are linearly translatable relative to the piston rod between a retracted position adjacent to the top mount plate and an extended position spaced apart from the top mount plate.

The present disclosure provides a second embodiment of a hydraulic lift actuator for adjusting the height of a vehicle. The hydraulic lift actuator of the second embodiment includes: a hydraulic cylinder having a tubular wall defining an interior chamber; a piston rod extending axially into the interior chamber; a piston assembly connected to the piston rod and disposed within the interior chamber; a flexible top mount plate configured for attachment to a chassis element of the vehicle, the flexible top mount plate including an upper plate surrounding the piston rod and spaced apart therefrom, a lower plate, and an isolator disposed between the upper plate and the lower plate, wherein the isolator is configured to dampen vibrations; an inner tube rigidly connected to the lower plate and the piston rod, wherein the inner tube is disposed within the interior chamber, and wherein the inner tube extends axially between the lower plate and the piston assembly; and a spring seat rigidly connected to the hydraulic cylinder and configured to engage a top end of a coil spring, wherein the spring seat and the hydraulic cylinder are linearly translatable between a retracted position adjacent to the flexible top mount plate and an extended position spaced apart from the flexible top mount plate.

The present disclosure provides a height adjustment system for adjusting the height of a vehicle. The height adjustment system includes: at least one wheel; a first suspension arrangement including: a coil spring having an upper end and a lower end coupled to one of the at least one wheel, and a hydraulic actuator, the hydraulic actuator including: a top mount plate attached to a chassis element of a vehicle; a hydraulic cylinder having a tubular wall and an end cap, together defining an interior chamber; a piston rod extending axially into the interior chamber; a piston assembly connected to the piston rod and disposed within the interior chamber, wherein the piston assembly divides the interior chamber into an upper chamber and a lower chamber, the lower chamber extending between the piston assembly and the end cap; a spring seat rigidly connected to the hydraulic cylinder and configured to engage an upper end of a coil spring, wherein the spring seat and the hydraulic cylinder are linearly translatable relative to the piston rod between a retracted position adjacent to the top mount plate and an extended position spaced apart from the top mount plate; and a controller operatively connected to the hydraulic actuator and configured to control fluid flow into and out of the lower chamber for adjusting the height of the vehicle.

BRIEF DESCRIPTION OF THE DRAWINGS

Further details, features and advantages of designs of the invention result from the following description of embodiment examples in reference to the associated drawings.

DESCRIPTION OF THE ENABLING EMBODIMENTS

Figure 1:
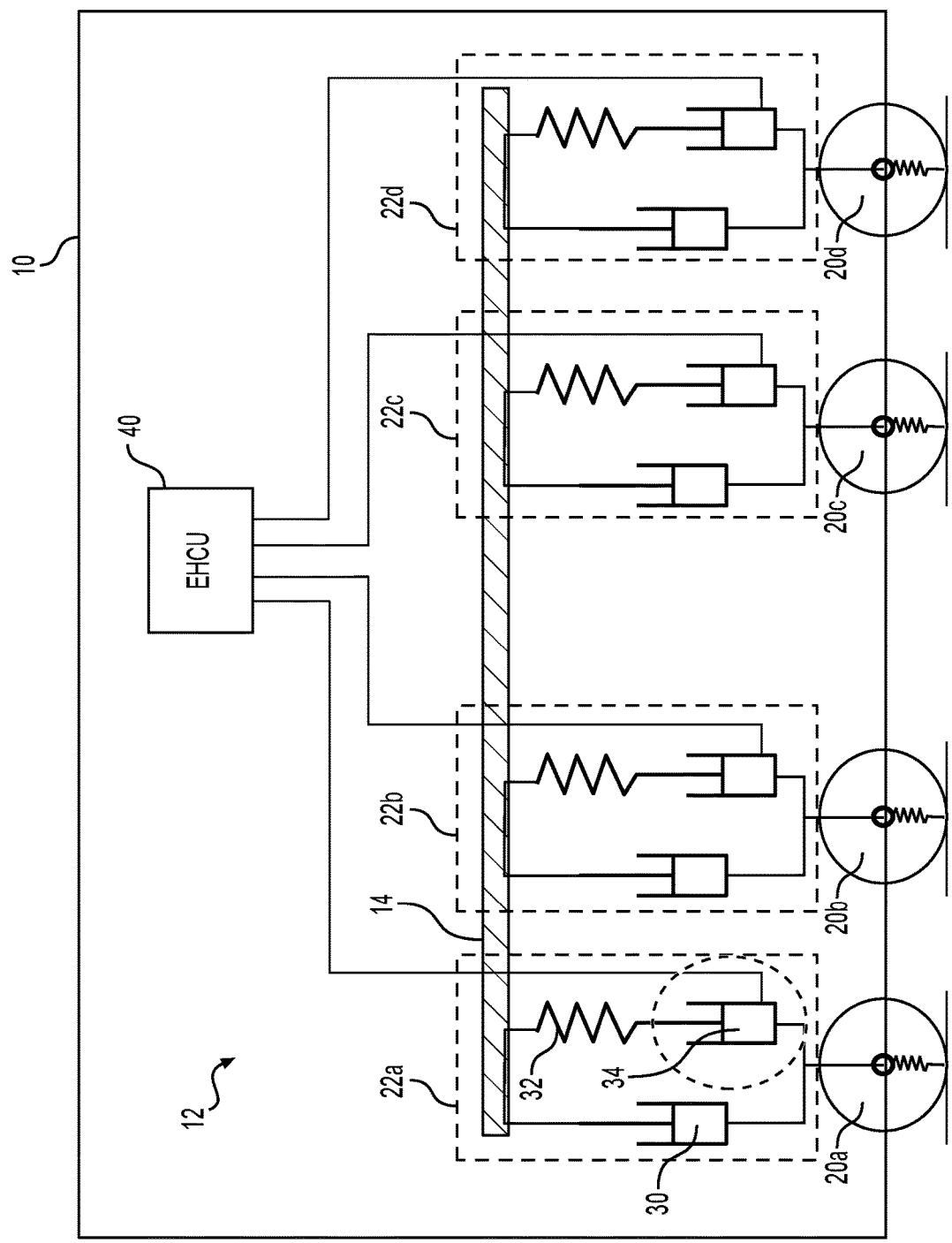
FIG. 1 shows a schematic block diagram of a vehicle with a system for adjusting height of the vehicle, in accordance with an aspect of the present disclosure.

Referring to the drawings, the present invention will be described in detail in view of following embodiments.

As shown in FIG. 1, a vehicle 10, such as a passenger car or truck, includes a height adjustment system 12 for adjusting the height of all or part of the vehicle 10. The vehicle 10 includes four wheels 20a, 20b, 20c, 20d. The four wheels 20a, 20b, 20c, 20d may include a front-left wheel 20a, a front-right wheel 20b, a rear-left wheel 20c, and a rear-right wheel 20d. However, the principles of the present disclosure may be implemented in vehicles having a different number of wheels, such as two wheels, three wheels or six wheels.

Each of the wheels 20a, 20b, 20c, 20d is coupled to a corresponding suspension arrangement 22a, 22b, 22c, 22d.

For simplicity of explanation, only the front-left suspension arrangement 22a is described, however, the suspension arrangements 22a, 22b, 22c, 22d may be similar or identical to one another. Alternatively, the vehicle 10 may include two or more different configurations of the suspension arrangements 22a, 22b, 22c, 22d. For example, ones of the suspension arrangements 22a, 22b, 22c, 22d associated with the front wheels 20a, 20b may be different than ones of the suspension arrangements 22a, 22b, 22c, 22d associated with the rear wheels 20c, 20d.

The front-left suspension arrangement 22a includes a shock absorber 30 disposed between the front-left wheel 20a and a chassis element 14 of the vehicle 10. The chassis element 14 may include, for example, a body, a frame, or a subframe assembly. The front-left suspension arrangement 22a includes a coil spring 32 that connects the front-left wheel 20a and the chassis element 14 of the vehicle 10. A lift actuator 34 is disposed between the coil spring 32 and the front-left wheel 20a and is configured to change a position of the coil spring 32 to adjust a height of the front-left corner of the vehicle 10. Alternatively, the lift actuator 34 may be located between the coil spring 32 and the chassis element 14 of the vehicle 10.

The height adjustment system 12 may be configured to adjust a tilt of the vehicle 10 by changing heights of some of the suspension arrangements 22a, 22b, 22c, 22d differently than the heights of other ones of the suspension arrangements 22a. 22b, 22c, 22d. For example, the height adjustment system 12 may tilt the nose of the vehicle 10 downwardly by reducing the height of the lift actuators 34 on the front end while maintaining the height or lifting the height of the lift actuators 34 on the rear end.

The height adjustment system 12 includes an electro-hydraulic control unit 40 in fluid communication with each of the lift actuators 34 of the suspension arrangements 22a, 22b, 22c, 22d for controlling fluid flow therebetween and thereby controlling positions of each of the lift actuators 34. The height adjustment system 12 may include other components not shown in FIG. 1, such as an electronic controller, and/or one or more sensors, such as level sensors to provide feedback regarding the actual level of one or more of the suspension arrangements 22a, 22b, 22c, 22d.

The lift actuators 34 may be mounted directly to the chassis element 14 of the vehicle 10. For example, the lift actuators 34 may be attached to a body of the vehicle 10. Alternatively or additionally, one or more of the lift actuators 34 may be attached to another component, such as a suspension arm. The figures of the present disclosure are intended to illustrate general concepts and do not show all features that may be included in a production product, such as protection elements like dust tubes or protection bellows.

Figure 2:
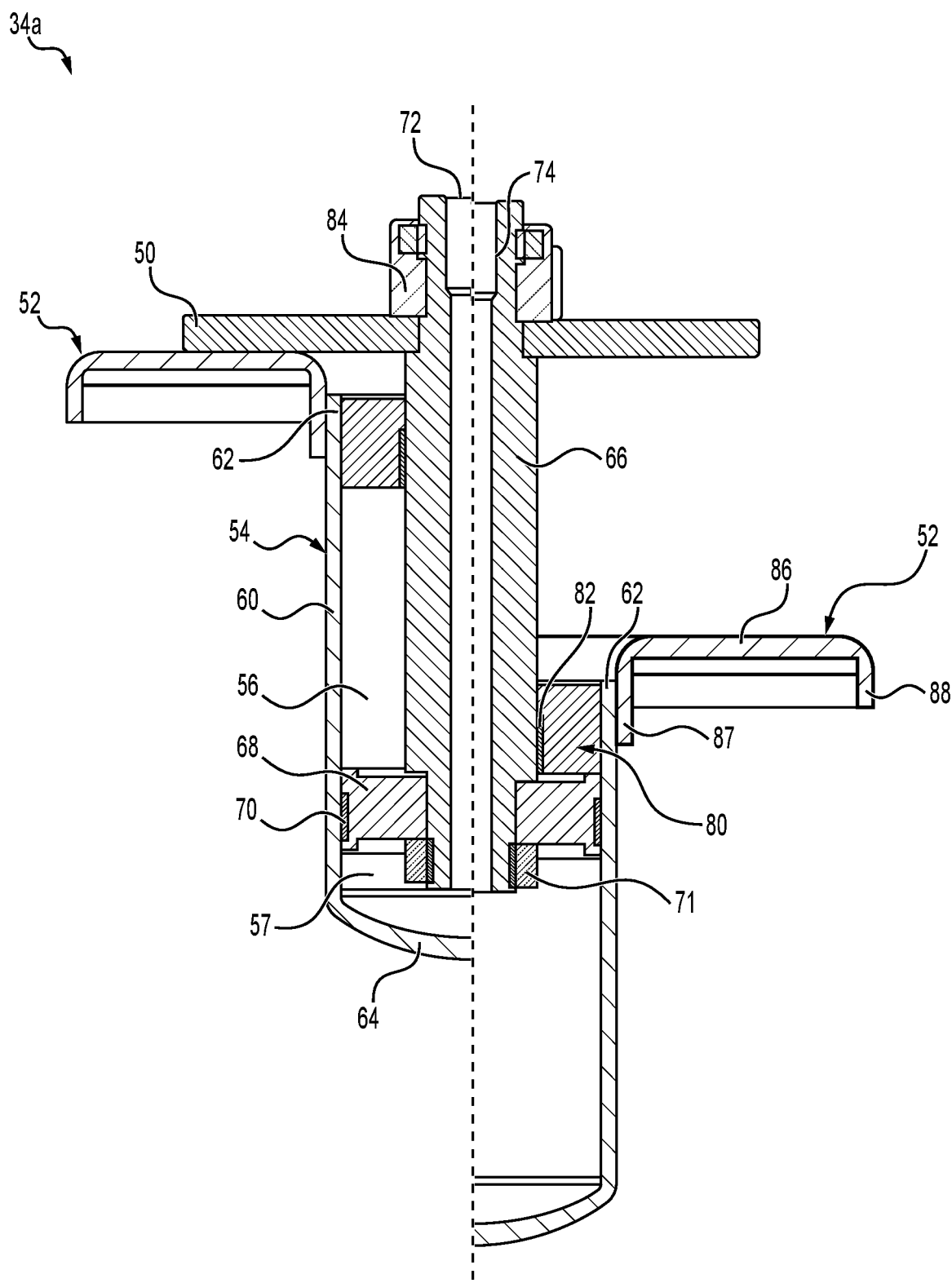
FIG. 2 shows a sectional view of a first hydraulic lift actuator of the present disclosure, with sections showing both extended and retracted positions.

FIG. 2 shows a sectional view of a first hydraulic lift actuator 34a of the present disclosure. The first hydraulic lift actuator 34a may be used as the lift actuator 34 in one or more of the suspension arrangements 22a, 22b, 22c, 22d. FIG. 2 shows a partial section on the left side of the first hydraulic lift actuator 34a in a retracted position. FIG. 2 also shows a partial section on the right side of the first hydraulic lift actuator 34a in an extended position. The retracted position corresponds to a minimal lifting position, and the extended position corresponds to a full lifted position of the corresponding one or more of the suspension arrangements 22a, 22b, 22c, 22d. The first hydraulic lift actuator 34a may be operated at any intermediate position between the retracted and extended positions.

The first hydraulic lift actuator 34a includes a first top mount plate 50 configured to attach to the chassis element 14 of the vehicle 10. The first hydraulic lift actuator 34a also includes a spring seat 52 configured to engage a top end of the coil spring 32 and to move relative to the first top mount plate 50 for selectively lifting a corresponding portion of the vehicle 10. The first hydraulic lift actuator 34a also includes a hydraulic cylinder 54 attached to the spring seat 52 and defining an interior chamber 56, 57.

The hydraulic cylinder 54 includes a tubular wall 60 having a proximal end 62 attached to the spring seat 52. However, the spring seat 52 may be attached to the tubular wall 60 at another location, which may depend on design requirements for a particular application. The hydraulic cylinder 54 also includes an end cap 64 enclosing a lower end of the tubular wall 60. A piston rod 66 extends through the first top mount plate 50 and the spring seat 52 and is connected to a first piston assembly 68, 70, which is configured to move through the interior chamber 56, 57 of the hydraulic cylinder 54. The first piston assembly 68, 70 includes a first piston body 68 and a first sealing element 70 that seals against an inner surface of the tubular wall 60 and divides the interior chamber 56, 57 into an upper chamber 56 and a lower chamber 57. The first sealing element 70 may have an annular shape, although a different shape may be used. A stop ring 71 is disposed around a lower end of the piston rod 66, within the hydraulic cylinder 54. The stop ring 71 may hold the first piston body 68 in position on the piston rod 66. For example, the stop ring 71 may be threaded or otherwise fixed on the lower end of the piston rod 66.

The piston rod 66 defines a fluid port 72 and a central bore 74 extending axially therethrough and providing fluid communication into the lower chamber 57. By pressurizing the central bore 74, fluid can enter the lower chamber 57 for acting on a lower surface of the first piston body 68, and thereby pushing the first piston assembly 68, 70 away from the end cap 64 for moving the first hydraulic lift actuator 34a from the retracted position and toward the extended position.

A rod guide 80 is disposed within the tubular wall 60 of the hydraulic cylinder 54 at the proximal end 62 and surrounds the piston rod 66. The rod guide 80 allows the piston rod 66 to translate relative to the hydraulic cylinder 54 while preventing radial motion thereof. The rod guide 80 also includes a guiding element 82 to reduce friction forces during translation. The rod guide 80 may also function as an movement stop to engage a top surface of the first piston body 68 with the first hydraulic lift actuator 34a in the full extended position.

The lift actuator 34 also includes a fastener 84, such as a threaded nut or other fixing element, disposed on an upper surface of the first top mount plate 50, opposite from the spring seat 52. The fastener 84 surrounds the piston rod 66 and provides mechanical integrity between the piston rod 66 and the first top mount plate 50 to transfer forces acting on the spring seat 52 to the chassis element 14 of the vehicle 10.

The spring seat 52 is attached to the tubular wall 60 of the hydraulic cylinder 54. In some embodiments, and as shown in FIG. 2, the spring seat 52 has a cup shape with a downward-facing opening (i.e. facing away from the first top mount plate 50) for receiving a top end of the coil spring 32. The spring seat 52 includes a flange portion 86 that having a flat ring shape. It should be appreciated that this is merely an example, and the spring seat 52 may have a different configuration, such as a different size and/or shape. A first tubular protrusion 87 extends axially from the flange portion 86 away from the first top mount plate 50 and surrounds the tubular wall 60 of the hydraulic cylinder 54. The first tubular protrusion 87 is secured to the tubular wall 60 and moves together therewith. For example, the first tubular protrusion 87 may be welded or otherwise fixed to the tubular wall 60 of the hydraulic cylinder 54. A second tubular protrusion 88 extends axially from the flange portion 86 away from an outer peripheral edge of the first top mount plate 50 for containing an end of the coil spring 32 (not shown in FIG. 2). It should be appreciated that this is merely an example, and the spring seat 52 could have a different shape. Additionally or alternatively, the spring seat 52 may be located in any position along a length of the tubular wall 60 of the hydraulic cylinder 54.

Figure 3:
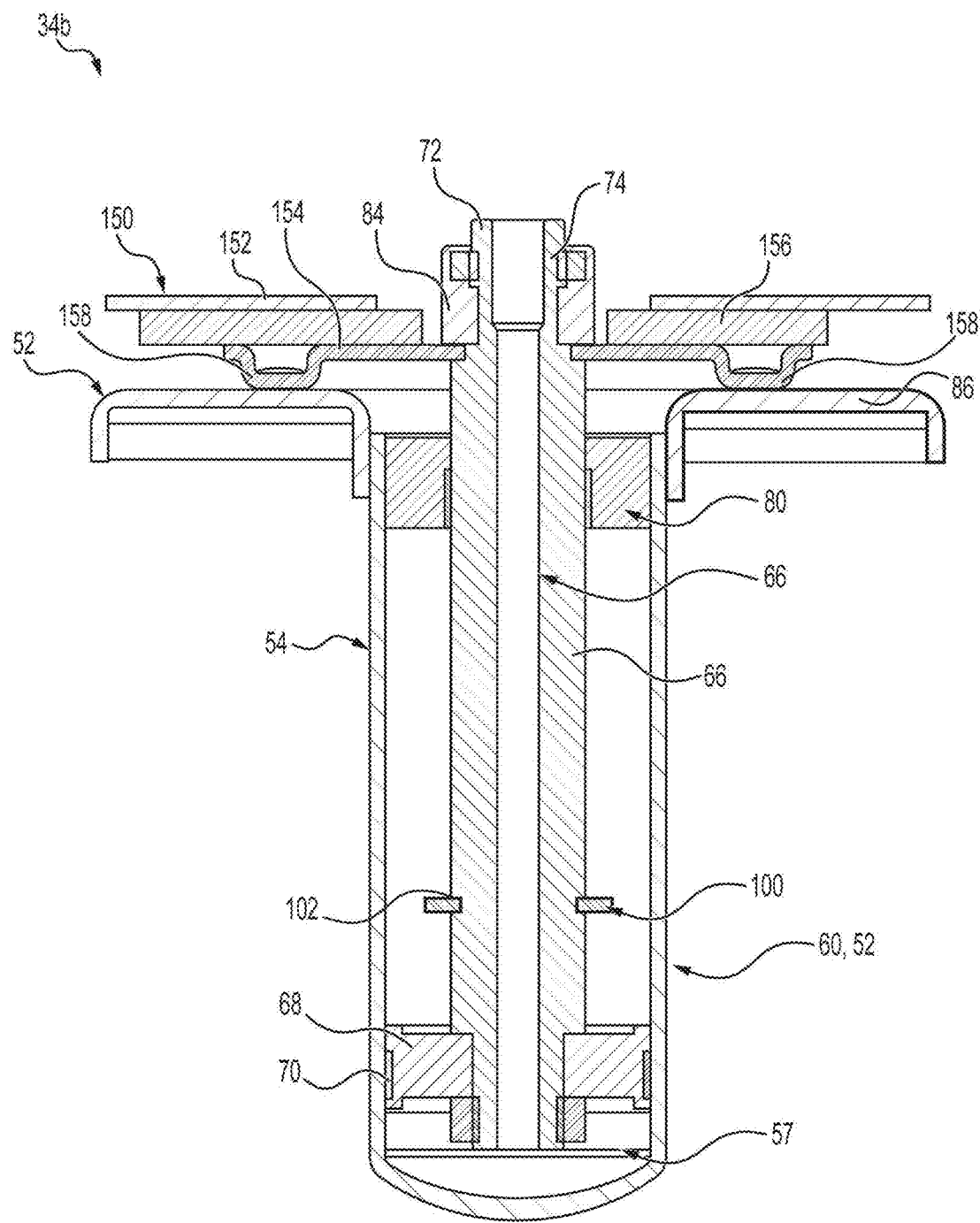
FIG. 3 shows a sectional view of a second hydraulic lift actuator of the present disclosure.

FIG. 3 shows a sectional view of a second hydraulic lift actuator 34b of the present disclosure. The second hydraulic lift actuator 34b may be used as the lift actuator 34 in one or more of the suspension arrangements 22a, 22b, 22c, 22d. The second hydraulic lift actuator 34b may be similar or identical to the first hydraulic lift actuator 34a, except for a few changes described herein.

The second hydraulic lift actuator 34b includes a spring seat 52 and a hydraulic cylinder 54 that may each be similar or identical to the corresponding structures in the first hydraulic lift actuator 34a.

The second hydraulic lift actuator 34b includes a first hard stop 100 disposed around the piston rod 66 and coupled thereto. The first hard stop 100 is axially spaced apart from the first piston body 68 and is configured to engage the rod guide 80 at the extended position of the second hydraulic lift actuator 34b. The first hard stop 100 may be disposed with a corresponding slot 102 in the piston rod 66. Additionally or alternatively, the first hard stop 100 may be welded otherwise fixed to the piston rod 66.

The second hydraulic lift actuator 34b also includes a second top mount plate 150 in place of the first top mount plate 50 of the first hydraulic lift actuator 34a. The second top mount plate 150 is configured to attach to the chassis element 14 of the vehicle 10. The second top mount plate 150 includes a first upper plate 152 and a first lower plate 154 with a first isolator 156 disposed therebetween. The first isolator 156 may be made of a reliant material, such as rubber, for isolating vibrations from being transmitted from the spring seat 52 to the chassis element 14 of the vehicle 10. The first lower plate 154 is fixed to the piston rod 66, and the first upper plate 152 surrounds the piston rod 66 and is spaced apart therefrom. The first lower plate 154 defines a plurality of first stand-off 158 configured to engage an upper surface of the flange portion 86 of the spring seat 52 when the second hydraulic lift actuator 34b is in a retracted position.

Figure 4:
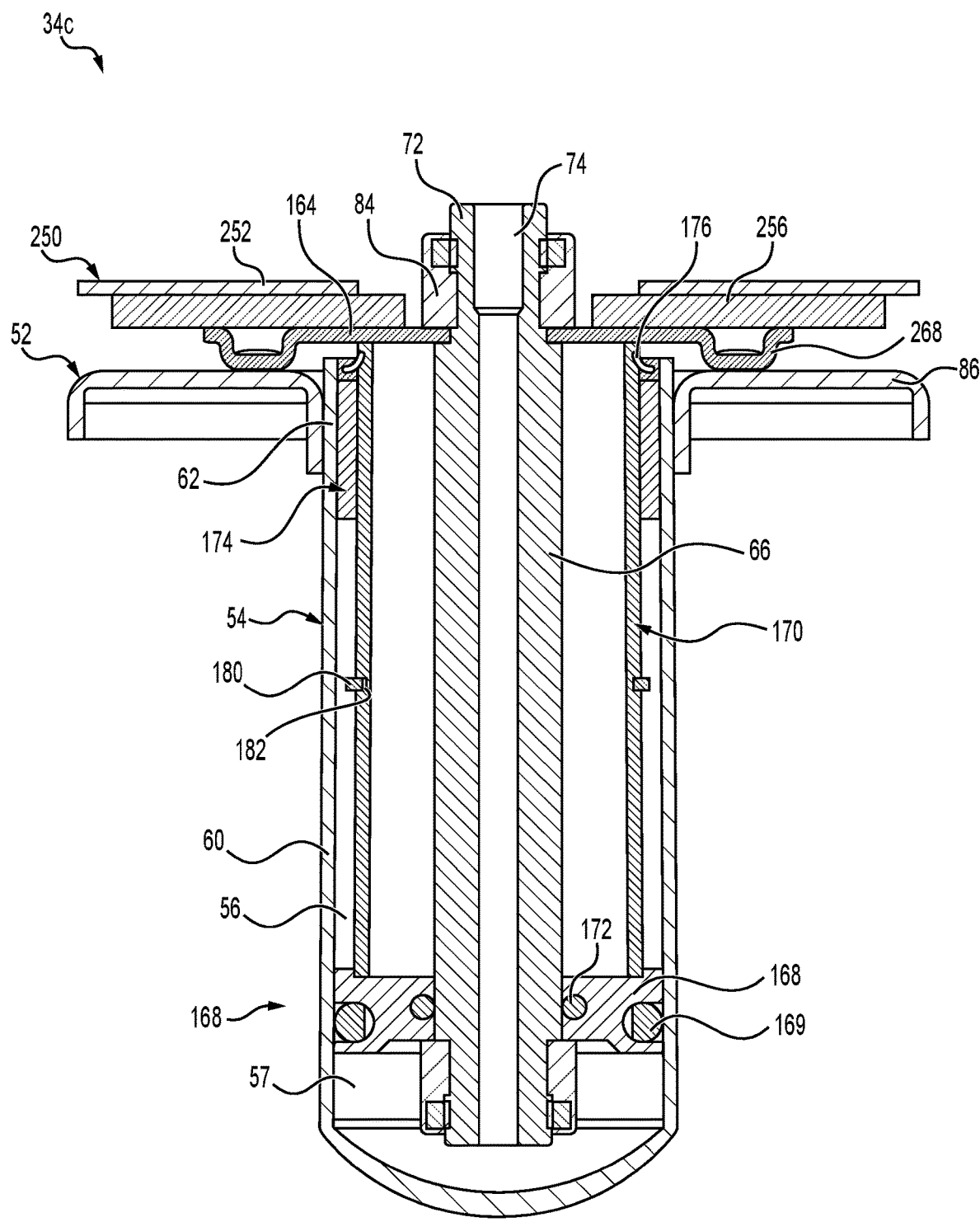
FIG. 4 shows a sectional view of a third hydraulic lift actuator of the present disclosure.

FIG. 4 shows a sectional view of a third hydraulic lift actuator 34c of the present disclosure. The third hydraulic lift actuator 34c may be used as the lift actuator 34 in one or more of the suspension arrangements 22a, 22b, 22c, 22d. The third hydraulic lift actuator 34c may be similar or identical to the second hydraulic lift actuator 34b, except for a few changes described herein.

The third hydraulic lift actuator 34c includes a spring seat 52 and a hydraulic cylinder 54 that may each be similar or identical to the corresponding structures in the second hydraulic lift actuator 34b.

The third hydraulic lift actuator 34c includes a second piston assembly 168, 169 that is different from the first piston assembly 68, 70 of the first hydraulic lift actuator 34a. Specifically, the second piston assembly 168, 169 includes a second piston body 168 and a second sealing element 169 that seals against an inner surface of the tubular wall 60. The second piston assembly 168, 169 also includes a third sealing element 172 that surrounds and seals against the piston rod 66. Each of the second sealing element 169 and the third sealing element 172 may have an annular shape, although a different shape may be used for either or both. For example, each of the second sealing element 169 and the third sealing element 172 may include an O-ring configured to fit within a corresponding groove in the second piston body 168. However, either or both of the second sealing element 169 and the third sealing element 172 may include another type of seal.

The third hydraulic lift actuator 34c includes a third top mount plate 250 in place of the second top mount plate 150 of the second hydraulic lift actuator 34b. The third top mount plate 250 is configured to attach to the chassis element 14 of the vehicle 10.

The third top mount plate 250 includes a second upper plate 252 and a second lower plate 164 with a second isolator 256 disposed therebetween. The second isolator 256 may be made of a reliant material, such as rubber, for isolating vibrations from being transmitted from the spring seat 52 to the chassis element 14 of the vehicle 10. The second lower plate 164 is fixed to the piston rod 66, and the second upper plate 164 surrounds the piston rod 66 and is spaced apart therefrom. The second lower plate 164 defines a plurality of second stand-off 268 configured to engage an upper surface of the flange portion 86 of the spring seat 52 when the third hydraulic lift actuator 34c is in a retracted position.

Unlike the second hydraulic lift actuator 34b, the third hydraulic lift actuator 34c further includes an inner tube 170 that is fixed to the second lower plate 164 and the piston rod 66 and which extends in an axial direction between the second lower plate 164 and the second piston body 168.

In place of the rod guide 80, the third hydraulic lift actuator 34c includes a tube guide 174 that is disposed within the tubular wall 60 of the hydraulic cylinder 54 at the proximal end 62 and surrounds the inner tube 170. The tube guide 174 allows the inner tube 170 to translate relative to the hydraulic cylinder 54 while preventing radial motion thereof. The tube guide 174 also includes a second wiper seal 176 to prevent intrusion of contaminants, such as dust or moisture.

The third hydraulic lift actuator 34c also includes a second hard stop 180 disposed around the inner tube 170 and coupled thereto. The second hard stop 180 is axially spaced apart from the second piston body 168 and is configured to engage the tube guide 174 at the extended position of the third hydraulic lift actuator 34c. The second hard stop 180 may be disposed with a corresponding annular groove 182 in the inner tube 170. Additionally or alternatively, the second hard stop 180 may be welded or otherwise fixed to the inner tube 170.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic lift actuator for adjusting a height of a vehicle, comprising:

a top mount plate configured for attachment to a chassis element of the vehicle;
a hydraulic cylinder having a tubular wall and an end cap, together defining an interior chamber;
a piston rod extending axially into the interior chamber;
a piston assembly connected to the piston rod and disposed within the interior chamber, wherein the piston assembly divides the interior chamber into an upper chamber and a lower chamber, the lower chamber extending between the piston assembly and the end cap; and
a spring seat rigidly connected to the hydraulic cylinder and configured to engage an upper end of a coil spring, wherein the spring seat and the hydraulic cylinder are linearly translatable relative to the piston rod between a retracted position adjacent to the top mount plate and an extended position spaced apart from the top mount plate,
wherein the top mount plate further comprises an upper plate, a lower plate connected to the piston rod, and an isolator disposed between the upper plate and the lower plate, wherein the lower plate further includes a plurality of stand-offs each configured to engage an upper surface of the spring seat when the spring seat is in the retracted position.

2. The hydraulic lift actuator of claim 1, further comprising a rod guide disposed within the interior chamber opposite the end cap and surrounding the piston rod, wherein the rod guide is configured to restrict radial movement of the piston rod.

3. The hydraulic lift actuator of claim 2, further comprising a hard stop rigidly connected to the piston rod within the upper chamber, wherein the hard stop is disposed between the rod guide and the piston assembly, and wherein the hard stop is configured to engage the rod guide and restrict the linear translation of the hydraulic cylinder.

4. The hydraulic lift actuator of claim 1, further comprising an inner tube fixed to the top mount plate and the piston rod, wherein the inner tube extends in an axial direction into the upper chamber between the top mount plate and the piston assembly, and wherein the inner tube surrounds the piston assembly.

5. The hydraulic lift actuator of claim 4, further comprising a tube guide disposed within the interior chamber opposite from the end cap and between the tubular wall and the inner tube.

6. The hydraulic lift actuator of claim 5, further comprising a hard stop rigidly connected to the inner tube within the upper chamber, wherein the hard stop is disposed between the tube guide and the piston assembly, and wherein the hard stop is configured to engage the tube guide and restrict the linear translation of the hydraulic cylinder.

7. The hydraulic lift actuator of claim 5, further comprising a wiper seal disposed within the upper chamber and between the inner tube and the tubular wall, wherein the wiper seal annularly surrounds the inner tube.

8. The hydraulic lift actuator of claim 1, wherein the spring seat includes a flange extending radially from the hydraulic cylinder, a first tubular protrusion extending perpendicular to the flange and rigidly connected to the hydraulic cylinder, and a second tubular protrusion spaced apart from first tubular protrusion and extending perpendicular to the flange, wherein the upper end of the coil spring is disposed between the first tubular protrusion and the second tubular protrusion.

9. The hydraulic lift actuator of claim 1, wherein the piston rod includes a fluid port and a central bore extending axially within the piston rod from the fluid port to the lower chamber, wherein the central bore is configured for conveying a fluid into and out of the lower chamber.

10. A hydraulic lift actuator for adjusting a height of a vehicle, comprising:
a hydraulic cylinder having a tubular wall defining an interior chamber;
a piston rod extending axially into the interior chamber;
a piston assembly connected to the piston rod and disposed within the interior chamber;
a flexible top mount plate configured for attachment to a chassis element of the vehicle, the flexible top mount plate including an upper plate surrounding the piston rod and spaced apart therefrom, a lower plate, and an isolator disposed between the upper plate and the lower plate, wherein the isolator is configured to dampen vibrations, wherein the lower plate further comprises stand-offs configured to engage an upper surface of the spring seat when the spring seat is in the retracted position;
an inner tube rigidly connected to the lower plate and the piston rod, wherein the inner tube is disposed within the interior chamber, and wherein the inner tube extends axially between the lower plate and the piston assembly; and
a spring seat rigidly connected to the hydraulic cylinder and configured to engage a top end of a coil spring, wherein the spring seat and the hydraulic cylinder are linearly translatable between a retracted position adjacent to the flexible top mount plate and an extended position spaced apart from the flexible top mount plate.

11. The hydraulic lift actuator of claim 10, further comprising a tube guide and a hard stop, wherein the tube guide is disposed within the interior chamber spaced apart from the piston assembly and between the tubular wall and the inner tube, wherein the hard stop is rigidly connected to the inner tube and is disposed between the tube guide and the piston assembly, and wherein the hard stop is configured to engage the tube guide and restrict the linear translation of the hydraulic cylinder.

12. The hydraulic lift actuator of claim 10, wherein the piston rod includes a fluid port and a central bore extending axially within the piston rod from the fluid port to the interior chamber, wherein the central bore is configured for conveying a fluid to and from the interior chamber.

13. A height adjustment system for adjusting a height of a vehicle, the height adjustment system comprising:
at least one wheel;
a first suspension arrangement including:
a coil spring having an upper end and a lower end coupled to one of the at least one wheel, and
a hydraulic actuator, the hydraulic actuator including:
a top mount plate attached to a chassis element of a vehicle;
a hydraulic cylinder having a tubular wall and an end cap, together defining an interior chamber;
a piston rod extending axially into the interior chamber;
a piston assembly connected to the piston rod and disposed within the interior chamber, wherein the piston assembly divides the interior chamber into an upper chamber and a lower chamber, the lower chamber extending between the piston assembly and the end cap;
a spring seat rigidly connected to the hydraulic cylinder and configured to engage the upper end of the coil spring, wherein the spring seat and the hydraulic cylinder are linearly translatable relative to the piston rod between a retracted position adjacent to the top mount plate and an extended position spaced apart from the top mount plate; and a controller operatively connected to the hydraulic actuator and configured to control fluid flow into and out of the lower chamber for adjusting the height of the vehicle, wherein the top mount plate further comprises an upper plate, a lower plate connected to the piston rod, and an isolator disposed between the upper plate and the lower plate, wherein the lower plate further includes a plurality of stand-offs each configured to engage an upper surface of the spring seat when the spring seat is in the retracted position.

14. The height adjustment system of claim 13, wherein the first suspension arrangement further comprises a shock absorber damper connected to the wheel and extending parallel to the hydraulic actuator.

15. The height adjustment system of claim 13, wherein the controller further includes an electronic control device and a hydraulic control device in an integrated package.

16. The height adjustment system of claim 13, further comprising a sensor configured to detect the height of the vehicle and transmit a signal regarding the height of the vehicle to the controller.

17. The height adjustment system of claim 13, further comprising a second suspension arrangement having a second hydraulic actuator, and wherein the controller is configured to independently control each of the hydraulic actuator and the second hydraulic actuator.

\* \* \* \* \*